(12) United States Patent
Zinck et al.

(10) Patent No.: US 9,263,745 B2
(45) Date of Patent: Feb. 16, 2016

(54) RECHARGEABLE ELECTROCHEMICAL BATTERY CELL

(75) Inventors: Laurent Zinck, Mothern (FR);
Christian Pszolla, Karlsruhe (DE);
Christiane Ripp, Pfinztal (DE); Markus Borck, Stuttgart (DE); Claudia Wollfarth, Karlsruhe (DE)

(73) Assignee: Alevo Research AG, Zug (CH)

( * ) Notice: Subject to any disclaimer, the term of this patent is extended or adjusted under 35 U.S.C. 154(b) by 361 days.

(21) Appl. No.: 13/091,495

(22) Filed: Apr. 21, 2011

(65) Prior Publication Data

US 2011/0287304 A1     Nov. 24, 2011

(30) Foreign Application Priority Data

Feb. 12, 2010    (EP) ..................................... 10001458

(51) Int. Cl.

| | |
|---|---|
| *H01M 4/58* | (2010.01) |
| *H01M 4/04* | (2006.01) |
| *H01M 4/136* | (2010.01) |
| *H01M 4/1397* | (2010.01) |
| *H01M 4/36* | (2006.01) |
| *H01M 4/583* | (2010.01) |
| *H01M 4/587* | (2010.01) |
| *H01M 4/62* | (2006.01) |
| *H01M 4/80* | (2006.01) |
| *H01M 10/0525* | (2010.01) |
| *H01M 10/0563* | (2010.01) |
| *H01M 10/056* | (2010.01) |
| *H01M 4/02* | (2006.01) |

(52) U.S. Cl.
CPC .......... *H01M 4/5825* (2013.01); *H01M 4/0404* (2013.01); *H01M 4/0435* (2013.01); *H01M 4/0471* (2013.01); *H01M 4/0473* (2013.01); *H01M 4/0478* (2013.01); *H01M 4/136* (2013.01); *H01M 4/1397* (2013.01); *H01M 4/366* (2013.01); *H01M 4/58* (2013.01); *H01M 4/581* (2013.01); *H01M 4/587* (2013.01); *H01M 4/5835* (2013.01); *H01M 4/62* (2013.01); *H01M 4/623* (2013.01); *H01M 4/808* (2013.01); *H01M 10/056* (2013.01); *H01M 10/0525* (2013.01); *H01M 10/0563* (2013.01); *H01M 2004/021* (2013.01); *H01M 2004/028* (2013.01); *H01M 2300/002* (2013.01); *Y02E 60/122* (2013.01)

(58) Field of Classification Search
CPC ............ H01M 4/5825; H01M 4/0404; H01M 4/0478; H01M 4/58; H01M 4/366; H01M 4/623; H01M 4/62; H01M 4/808; H01M 10/0563; H01M 10/056; H01M 10/0525; H01M 2004/021; H01M 2004/028; H01M 2300/002; Y02E 60/122

USPC ................ 429/346, 345, 231.1, 231.2, 231.3, 429/231.5, 231.8, 233, 221
See application file for complete search history.

(56) References Cited

U.S. PATENT DOCUMENTS

| | | |
|---|---|---|
| 5,213,914 A | 5/1993 | Heitbaum et al. |
| 5,910,382 A | 6/1999 | Goodenough et al. |
| 6,280,878 B1 | 8/2001 | Maruyama et al. |
| 6,709,789 B1 | 3/2004 | Hambitzer et al. |
| 6,730,441 B1 | 5/2004 | Hambitzer et al. |
| 7,338,734 B2 | 3/2008 | Chiang et al. |
| 2002/0025477 A1 | 2/2002 | Itagaki et al. |
| 2003/0157409 A1 | 8/2003 | Huang |
| 2004/0048152 A1 | 3/2004 | Yata et al. |
| 2004/0157129 A1 | 8/2004 | Hambitzer et al. |
| 2004/0265695 A1 | 12/2004 | Barker et al. |
| 2007/0065714 A1 | 3/2007 | Hambitzer et al. |
| 2007/0172739 A1* | 7/2007 | Visco et al. ................... 429/322 |
| 2009/0280405 A1 | 11/2009 | Sannier et al. |
| 2010/0062341 A1 | 3/2010 | Hambitzer |
| 2010/0259224 A1 | 10/2010 | Zinck et al. |

FOREIGN PATENT DOCUMENTS

| | | |
|---|---|---|
| CN | 1780031 A | 5/2006 |
| CN | 101212070 A | 7/2008 |
| DE | 3604541 C2 | 2/1989 |
| JP | 2005-514304 A | 5/2005 |

(Continued)

OTHER PUBLICATIONS

Foster et al., "New Highly Conductive Inorganic Electrolytes: The Liquid SO2 Solvates of the Alkali and Alkaline Earth Metal Tetrachloroaluminates," J. Electrochem. Soc., 135(11):2682-2686 (Nov. 1988).

George, "Atomic Layer Deposition: An Overview," Chem. Rev., 110(1):111-131 (2010).

Porcher et al., "Design of Aqueous Processed Thick LiFePO4 Composite Electrodes for High-Energy Lithium Battery," J. Electrochem. Soc., 156(3):A133-A144 (2009).

(Continued)

*Primary Examiner* — Laura Weiner
(74) *Attorney, Agent, or Firm* — Bose McKinney & Evans LLP

(57) ABSTRACT

Rechargeable lithium battery cell having a housing, a positive electrode, a negative electrode and an electrolyte containing a conductive salt, wherein the electrolyte is based on SO2 and the positive electrode contains an active material in the composition $Li_xM'_yM''_z(XO_4)_aF_b$, wherein M' is at least one metal selected from the group consisting of the elements Ti, V, Cr, Mn, Fe, Co, Ni, Cu and Zn, M" is at least one metal selected from the group consisting of the metals of the groups IIA, IIIA, IVA, VA, VIA, IB, IIB, IIIB, IVB, VB, VIB and VIIIB, X is selected from the group consisting of the elements P, Si and S, x is greater than 0,
y is greater than 0,
z is greater than or equal to 0,
a is greater than 0 and
b is greater than or equal to 0.

28 Claims, 6 Drawing Sheets

(56) References Cited

FOREIGN PATENT DOCUMENTS

| WO | WO 00/44061 A1 | 7/2000 |
| WO | WO 00/79631 A1 | 12/2000 |
| WO | WO 02/103827 A2 | 12/2002 |
| WO | WO 03/038930 A2 | 5/2003 |
| WO | WO 03/056646 A1 | 7/2003 |
| WO | WO 2005/031908 A2 | 4/2005 |
| WO | WO 2007/144488 A1 | 12/2007 |
| WO | WO 2008/058685 A1 | 3/2008 |
| WO | WO 2008/138132 A1 | 11/2008 |
| WO | WO 2008/147751 * | 12/2008 |
| WO | WO 2008/147751 A1 | 12/2008 |
| WO | WO 2009/077140 A1 | 6/2009 |

OTHER PUBLICATIONS

Sundaram et al., "Leading Edge Atomic Layer Deposition Application," ECS Transactions, 16(4):19-27 (2008).

Zinck et al., "Purification process for an inorganic rechargeable lithium battery and new safety concepts," J. Applied Electrochem., 36:1291-1295 (2006).

Padhi et al., "Phospho-olivines as Positive-Electrode Materials for Rechargeable Lithium Batteries," J. Electrochem. Soc., 1188-1194 (1997).

* cited by examiner

RECHARGEABLE ELECTROCHEMICAL BATTERY CELL

This application is a continuation of International Application No. PCT/EP2011/000507 filed Feb. 4, 2011, which is hereby incorporated by reference.

The invention relates to a rechargeable lithium battery cell having a positive electrode, a negative electrode and an electrolyte containing a conductive salt.

Rechargeable battery cells are of great importance in many technical fields. In many cases they are used for applications in which only relatively low currents are needed, such as in cell phones. There is also a large requirement for battery cells for high-current applications. An important example are electrical drives for motor vehicles. The present invention is primarily directed to cells that are also suitable for high-current applications.

An important requirement is a high energy density. The cell should contain the largest possible amount of electrical energy per unit weight and volume. Lithium is particularly advantageous as an active metal in this respect.

In practice, rechargeable battery cells are almost exclusively lithium-ion cells. Their negative electrode comprises copper coated with carbon, into which lithium ions are inserted during charging. The positive electrode also comprises an insertion material, which is suitable for absorbing ions of the active metal. In general, the positive electrode is based on lithium cobalt oxide, which is coated on a current collector element made of aluminum. Both electrodes are very thin (thickness generally less than 100 µm). During charging, the ions of the active metal are extracted from the positive electrode and inserted in the negative electrode. The reverse process takes place during discharge. Transport of the ions between the electrodes is performed by the electrolyte, which provides the required ion mobility. Lithium-ion cells contain an electrolyte consisting of a lithium salt (e.g. $LiPF_6$) dissolved in an organic solvent or solvent mixture (e.g. based on ethylene carbonate). Said cells will hereafter also be referred to as "organic lithium-ion cells".

Organic lithium-ion cells are problematic with respect to safety. Safety risks are posed in particular by the organic electrolyte. If a lithium-ion cell catches fire or even explodes, the organic solvent of the electrolyte forms the combustible material. In order to avoid such risks, it is necessary to take additional measures, particularly with respect to exact control of the charging and discharging processes and with respect to additional safety measures in battery construction. For example, the cell can contain components that melt in the event of a fault and flood the battery with molten plastic. However, these measures lead to increased costs and increase the volume and weight, thereby reducing the energy density.

The problems are particularly severe if battery cells are to be developed for high-current applications. The requirements with respect to stability and long-term operating safety are particularly high. The term "high-current cells" is used here to designate cells that (at nominal voltage) have a current carrying capacity referred to the electrode area (hereafter "ampacity per unit area") of at least $10\,mA/cm^2$, preferably at least $50\,mA/cm^2$ and particularly preferably at least $150\,mA/cm^2$.

There is a great need for improved rechargeable battery cells that meet in particular the following requirements:
- Very good electrical power data, in particular high energy density and simultaneously high extractable currents (power density).
- Safety, also under the difficult ambient conditions in a motor vehicle.
- Long service life, in particular a large number of useful charging and discharging cycles.
- Lowest possible price, i.e. inexpensive materials and production methods with minimum complexity.
- Other important requirements for practical operation such as overcharging capability and deep discharge capability.

The invention addresses the technical problem of making available a battery cell that—overall—meets these partly contradictory requirements better than known cells.

The technical problem is solved by an electrochemical rechargeable lithium battery cell having a housing, a positive electrode, a negative electrode and an electrolyte containing a conductive salt,
wherein
the electrolyte is based on $SO_2$ and
the positive electrode contains an active material in the composition $Li_xM'_yM''_z(XO_4)_aF_b$, wherein
M' is at least one metal selected from the group consisting of the elements Ti, V, Cr, Mn, Fe, Co, Ni, Cu and Zn,
M" is at least one metal selected from the group consisting of the metals of the groups II A, III A, IV A, V A, VI A, IB, IIB, IIIB, IVB, VB, VIB and VIIIB,
X is selected from the group consisting of the elements P, Si and S,
x is greater than 0,
y is greater than 0,
z is greater than or equal to 0,
a is greater than 0 and
b is greater than or equal to 0.

The active material is preferably a phosphate, and the component X thus phosphorus. The metal M' is particularly preferably iron. According to a further preferred embodiment, a is equal to 0 and the active material thus does not contain any fluorine.

"At least one metal" is to be understood such that the components M' and M" each may consist of two or more of the stated metals. The suffixes y and z refer to the totality of metals that are represented by M' and M. The condition of charge neutrality must obviously be observed. The sum of positive charges of the components Li, M' and M" must thus equal the sum of the negative charges of the components $(XO_4)$ and (where appropriate) F.

For reasons of simplification reference will hereafter made to lithium iron phosphate, as representative also for the other compounds covered by the above-mentioned definition, and without limiting the generality. The abbreviation "LIP" will be used for lithium iron phosphate.

In the context of the invention, the term "$SO_2$-based electrolyte" designates an electrolyte containing $SO_2$ not just in low concentration as an additive, but in which the $SO_2$ at least to some degree enables the mobility of the ions of the conductive salt contained in the electrolyte, thus ensuring the charge transport. The electrolyte is preferably essentially free of organic materials, whereby "essentially free" is to be construed such that the quantity of any organic materials present is so small that they do not represent any safety risk. Lithium cells with an $SO_2$-based electrolyte are hereafter referred to as Li—$SO_2$ cells.

Since many years there have been discussions about $SO_2$-based electrolytes for lithium cells. In
(1) "Handbook of Batteries", David Linden (Editor), 2nd edition, McGraw-Hill, 1994
the high ionic conductivity of an $SO_2$-based inorganic electrolyte is emphasized. It is stated that this electrolyte is also advantageous with respect to other electrical data. It is further stated therein that systems with an $SO_2$-based electrolyte have been under investigation for a long time and are still of interest for special applications, but that the further commercial applicability is limited, in particular since the electrolyte is toxic and highly corrosive.

Battery cells with $SO_2$ electrolytes are described in the following documents, for example:

(2) U.S. Pat. No. 5,213,914
(3) WO 00/44061 and U.S. Pat. No. 6,709,789
(4) WO 00/79631 and U.S. Pat. No. 6,730,441
(5) WO 2005/031908 and US 2007/0065714
(6) L. Zinck et al. "Purification process for an inorganic rechargeable lithium battery and new safety concepts", J. Appl. Electrochem., 2006, 1291-1295
(7) WO 2008/058685 and US Patent Application 2010/0062341
(8) WO 2009/077140

In the exemplary embodiments described in these documents, the positive electrodes are always based on a lithium metal oxide, in particular based on lithium cobalt oxide.

Lithium metal phosphates have also been known for a long time as a positive electrode material for lithium-ion cells with organic electrolytes. Early experimental investigations are reported in (9) U.S. Pat. No. 5,910,382
(10) Padhi et al. "Phospho-olivines as Positive-Electrode Materials for Rechargeable Lithium Batteries", J. Electrochem. Soc., 1997, 1188-1194

In (9) and (10), cathode materials for lithium cells are studied that contain the polyanion $(PO_4)^{3-}$. The study refers to compounds with the metals Mn, Fe, Co and Ni that are present in two different structures, namely the olivine structure and the NASICON structure. The influence of the structures on the insertion of lithium is described and experiments with battery cells are reported herein in which a small number of charging cycles (maximum of 25 cycles) were performed.

(9) and (10) also emphasize the problems that are associated with the use of LIP electrodes in lithium-ion cells. A cell voltage of only 3.5 V is described even for a very small ampacity per unit area of 0.05 mA/cm². In comparison, the cell voltage with a lithium cobalt oxide electrode is 4 V and thus approximately 14% higher. Furthermore, the electrical conductivity of the LIP is very poor. This leads to a significant decrease in the cell voltage even with low current loads. The capacity of the cells also shows strong dependence on the current load and falls to values that make the cell essentially useless even with an ampacity per unit area of less than 0.2 mA/cm².

According to
(11) U.S. Pat. No. 7,338,734 these problems can be solved, in a lithium-ion cell with organic electrolyte, by enlarging the specific surface area of the active material of the positive electrode (in other words using a material consisting of very small particles) and using instead of a pure lithium iron phosphate a material that is doped with one of the elements of the groups II A, III A, IV A, V A, VIA and III B of the periodic system, in particular niobium.

In comparison with the previously known organic lithium-ion cells with a positive LIP electrode, this causes a significant improvement of the electrical data. However, manufacture of the cells is very complex, particularly due to the required doping of the LIP material, due to the production of very fine LIP fractions, due to the casting of thin (film-type) electrode layers and due to assembly of the cells with the thin electrode layers.

The inventors have found that, surprisingly, very good electrical power data—also for high-current applications—can be achieved with substantially less expense by using a positive LIP electrode in an $L_1$-$SO_2$ cell. The invention allows to use lithium ion phosphate even without doping and still guarantees a high current carrying capacity. It is also not necessary to use an extremely fine-grain LIP. In the context of the invention, it has been found advantageous to use an LIP with a specific surface area of no more than 40 m²/g, measured according to the Brunauer-Emmett-Teller (BET) method. It is also possible to use advantageously materials with no more than 30 m²/g and even materials with no more than 15 m²/g. The preferred mean particle size is at least 0.2 µm. It is also possible to use advantageously materials with a mean particle size of at least 0.5 µm, at least 1 µm or even at least 2 µm.

The positive electrode according to the invention is preferably porous. However, the porosity should preferably not be too high. The following maximum values for porosity are particularly preferred in this order: 50%, 45%, 40%, 35%, 30%, 25%, 20%.

During operation of the cell the pores of the positive electrode are preferably completely filled with electrolyte. Suitable conductive salts of the electrolyte are in particular aluminates, halogenides, oxalates, borates, phosphates, arsenates and gallates of an alkali metal or alkaline earth metal. In the context of the invention a lithium tetrahalogenoaluminate is preferably used, and particularly preferably a lithium tetrachloroaluminate.

The electrolyte preferably contains at least 2.0 mol $SO_2$ per mole of conductive salt, the following values being further preferred in this order: at least 2.5 mol $SO_2$ per mole of conductive salt, at least 3.0 mol $SO_2$ per mole of conductive salt, at least 4.0 mol $SO_2$ per mol conductive salt. The inventors have found that, surprisingly, an electrolyte with a relatively low concentration of conductive salt is advantageous, in particular with respect to stability over a large number of cycles, and in spite of the resultant higher vapor pressure.

A cell according to the invention is particularly advantageous if the thickness of the positive electrode is at least 0.25 mm, preferably at least 0.3 mm, further preferably at least 0.4 mm, further preferably at least 0.5 mm and particularly preferably at least 0.6 mm. The quantity of active material per unit area of the positive electrode ("loading") should also be high. It is preferably at least 30 mg/cm², the following minimum values being more preferred in this order: 40 mg/cm², 60 mg/cm², 80 mg/cm², 100 mg/cm², 120 mg/cm² and 140 mg/cm².

Significant advantages are associated with the large thickness of the positive electrode and the correspondingly high loading with active material. In particular, the capacity referred to the area of the positive electrode ("capacity per unit area") is very high. The theoretical capacity of LIP is 169 mAh/g. In experimental testing of the invention, it was found that this theoretical value is achieved in very good approximation (more than 90%) in an $L_1$-$SO_2$ cell. The capacity per unit area of the positive electrode is preferably at least 5 mAh/cm², the following minimum values being even more preferred in this order: 7.5 mAh/cm², 10 mAh/cm², 12.5 mAh/cm², 15 mAh/cm², 20 mAh/cm², 25 mAh/cm².

The inventors have found that by combining a LIP electrode and an $SO_2$-based electrolyte it is possible to manufacture an electrochemical battery cell that is significantly improved with respect to the combined requirements described above, said cells being particularly suitable for applications related to electromobility (battery and hybrid vehicles, for example):

The high loading of the positive electrode and the resultant high capacity per unit area allow production of cells that have a high total capacity with relatively small electrode area. The loading can significantly exceed the minimum values stated above and reach a value of more than 100 mg/cm². An area of only 60 cm² is then required for a capacity of 1 Ah. The required electrode area is a factor of three less than for conventional LIP electrodes described for organic lithium-ion cells, which have a thickness of 50 to 90 μm and a loading per unit area of 4 to 6 mAh/cm², and which consequently require a total electrode area of 170 to 250 cm² to provide a capacity of 1 Ah. As a result of the reduced area of the positive electrode, the areas of the separator and of the negative electrode are also reduced. Furthermore, for example in the case of prismatic cells with a plurality of electrodes, a smaller number of current collector tabs is required for connection with the cell terminals. Also interconnection of the electrodes in the housing is much simpler with a small number of electrodes.

The current carrying capacity is very high. Positive electrodes according to the invention are able to provide an ampacity per unit area of 300 mA/cm², for example.

At least 90% of the theoretical capacity of the positive electrode can be used in practice. This means that the lithium ions can be extracted almost completely from the positive electrode during charging and inserted in the positive electrode again during discharging. The invention also allows to achieve good values with respect to the dependence of the capacity on the current carrying capacity. In other words, a large part of the original capacity of the cell is still available with a high current load. Overall, during the service life of the cell, the practically useful capacity of the cell according to the invention is higher than with a lithium cobalt oxide electrode, although the theoretical capacity of the LIP is only 60% in comparison with lithium cobalt oxide.

The high number of charging and discharging cycles required for electromobility applications is possible. More than 9,000 full cycles were achieved in experimental testing.

It is not necessary to regenerate the electrolyte by overcharging the cell, such as is described in document (8), for example. Consequently the coulometric efficiency is increased. However, the cell according to the invention is capable of overcharging if this is required in a specific application.

The self-discharge of the cell according to the invention is exceptionally low. It can therefore be stored for a long period in charged condition and used immediately without renewed charging. Furthermore, the safety risk of "thermal runway" associated with self-discharge, as described in document (2) for example, is eliminated.

The stability of a negative carbon electrode, as preferably used in the context of the invention, is significantly improved. The negative electrode can even be manufactured without a binding agent.

It is not necessary to use a relatively high share of carbon-based conductivity-improving material in the active material of the positive electrode, as described in documents (9), (10) and (11). Rather, relatively small quantities of conductivity-improving material are sufficient. The carbon content of the positive electrode is preferably less than 10 wt. %, the following maximum values being further preferred in this order: 7 wt. %, 5 wt. %, 2 wt. %.

The share of binding agent can also be very low. The positive electrode preferably contains no more than 10% binding agent, the following maximum values being further preferred in this order: 7 wt. %, 5 wt. %, 2 wt. %.

On the basis of the information available prior to the invention, it could not be expected that an $L_1$-$SO_2$ cell with LIP as the active material of the positive electrode would be functional and even particularly advantageous.

As mentioned, the cell voltage of a lithium-ion cell with LIP is almost 15% lower than the cell voltage of a lithium-ion cell with lithium cobalt oxide. Consequently, a correspondingly lower value of the energy density was to be expected.

The previously published documents on Li—$SO_2$ cells described a positive electrode based on an oxide, particularly lithium cobalt oxide, as being ideal in combination with the $SO_2$ electrolyte. In document (5) an activating cleaning process was recommended to improve the electrode properties.

The electrodes are in contact with the electrolyte in the cell and can therefore react primarily only with the electrolyte. The electrolyte is therefore decisive for possible reactions of the materials contained in the electrodes. A problematic characteristic of an $SO_2$-based electrolyte, as already described in document (1), is its high level of corrosiveness. The chemical behavior of LIP in an organic electrolyte does not tell anything about its chemical resistance in a fundamentally different $SO_2$-based inorganic electrolyte. Since lithium cobalt oxide had proven itself in an Li—$SO_2$ cell, alternatives were sought, if at all, in chemically related oxide compounds.

Good conductivity was seen as being the most important advantage of an $SO_2$-based electrolyte. On the other hand, it was known that LIP is a very poorly conducting electrode material. On this basis it seemed illogical, when developing a battery cell for high-current applications, to combine an electrolyte that is advantageous with respect to the internal resistance of the cell with an electrode material that is obviously disadvantageous in this regard.

It is already mentioned in document (1) that the selection of positive electrode materials for an $L_1$-$SO_2$ cell is restricted to such compounds that are reduced at potentials above the reduction potential of $SO_2$. Since the reduction potential of LIP (2.9 V) is considerably lower than that of lithium cobalt oxide (3.5 V), there remains only a narrow voltage range in which the cell should be, preferably completely, charged and discharged. When testing the LIP in an organic cell according to documents (9) and (10), only about 60% of the lithium was extracted from the LIP, although charging and discharging took place with an extremely low ampacity per unit area of 50 μA/cm².

Both the LIP-based positive electrode and the carbon-based negative electrode are intercalation electrodes operating by insertion of the active metal lithium in their grid structure during charging and discharging. To such intercalation electrodes, and generally also other insertion electrodes that are suitable for taking up lithium internally, relates a preferred embodiment of the invention, according to which at least one of the electrodes in battery cells with an $SO_2$-based electrolyte is an insertion electrode suitable for taking in lithium ions, said electrode being pretreated to reduce the covering layers. Such an embodiment is advantageous for the above-described rechargeable lithium battery cell with a positive LIP electrode, but is also of significance for all insertion electrodes in an $SO_2$-based electrolyte.

The cover-layer-reduction pretreatment relates to the formation of covering layers on the surface of insertion electrodes during the initial charging cycles. Covering layer formation does not just consume charging current, but also leads to an irreversible consumption of active components of the battery system and thus to a reduction in capacity for the remaining battery service life. The capacity loss associated with covering layer formation is reduced by the cover-layer-reduction pretreatment.

The invention is illustrated in more detail hereafter on the basis of the figures. The technical features shown and described therein can be used individually or in combination to create preferred embodiments of the invention. In the figures.

Figure 1:
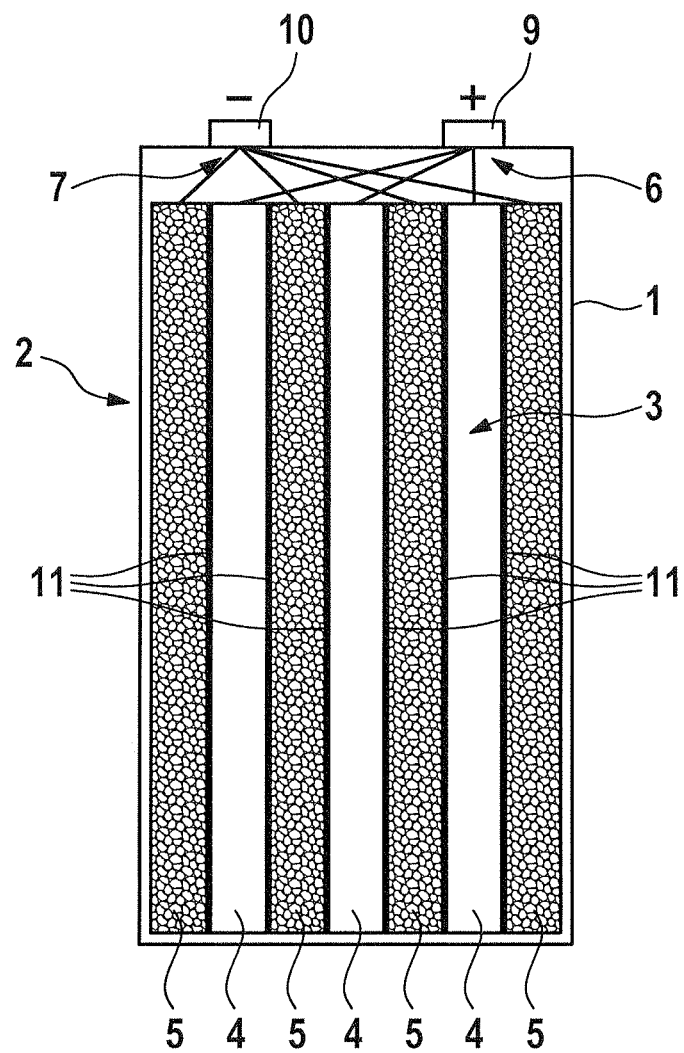
FIG. 1 shows a cross-sectional view of a battery cell according to the invention.

The housing 1 of the rechargeable battery cell 2 shown in FIG. 1 encloses an electrode arrangement 3 comprising a plurality (three in the case shown) of positive electrodes 4 and a plurality (four in the case shown) of negative electrodes 5. The electrodes 4, 5 are connected in the usual manner with corresponding terminal contacts 9, 10 of the battery by means of electrode leads 6, 7. The cell is filled with an $SO_2$-based electrolyte, not shown in the figures, in such a manner that the electrolyte preferably penetrates completely into all pores, particularly inside the electrodes 4, 5.

As is common, the electrodes 4, 5 have a planar shape, i.e. they are shaped as layers having a thickness which is small relative to their extension in the other two dimensions. They are separated from each other by separators 11. The housing 1 of the prismatic cell shown is essentially cuboid, the electrodes and the walls shown in cross-section in FIG. 1 extending perpendicularly to the drawing plane and being essentially straight and flat. However, the cell according to the invention can also be designed as a spirally wound cell.

The electrodes 4, 5 comprise in usual manner a current collector element, which is made of metal and serves to provide the required electronically conductive connection of the active material of the respective electrode. The current collector element is in contact with the active material involved in the electrode reaction of the respective electrode. Preferably, the current collector element of the positive electrode, most preferably also the current collector element of the negative electrode, is provided in the form of a three-dimensional porous metal structure, particularly in the form of a metal foam. The term "three-dimensional porous metal structure" designates in this context every structure made of metal that does not just extend like a thin sheet only over the length and width of the planar electrode, but also extends over its thickness dimension, and which is porous in such a manner that the active material of the electrode can be incorporated into the pores.

Figure 2:
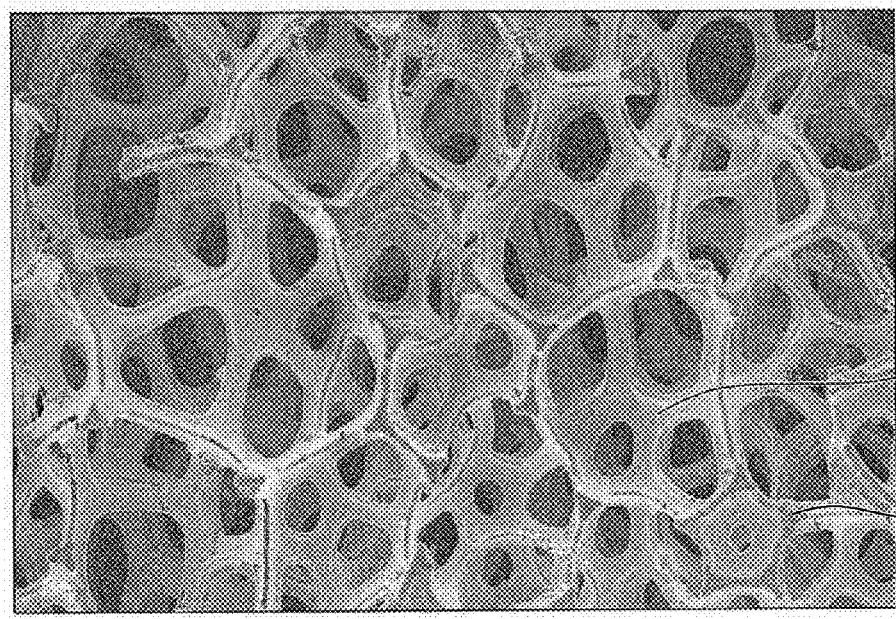
FIG. 2 shows a cross-sectional view of a metal foam suitable for the invention.

FIG. 2 shows an electron microscope image of a cross-section of a metal foam structure suitable for the invention. On the basis of the indicated scale, it is evident that the pores P have on average a diameter of more than 100 μm and thus are relatively large. Instead of the metal foam, it is also possible to use a different three-dimensional metal structure, for example in the form of a metal fleece or metal fabric.

During manufacture of the electrode, the LIP material is incorporated into the porous structure of the current collector element such that it fills the pores of the current collector element uniformly over the whole thickness of the metal structure. The material is then pressed under high pressure, the thickness after the pressing operation being preferably no more than 50%, particularly preferably no more than 40%, of the initial thickness.

Figure 3:
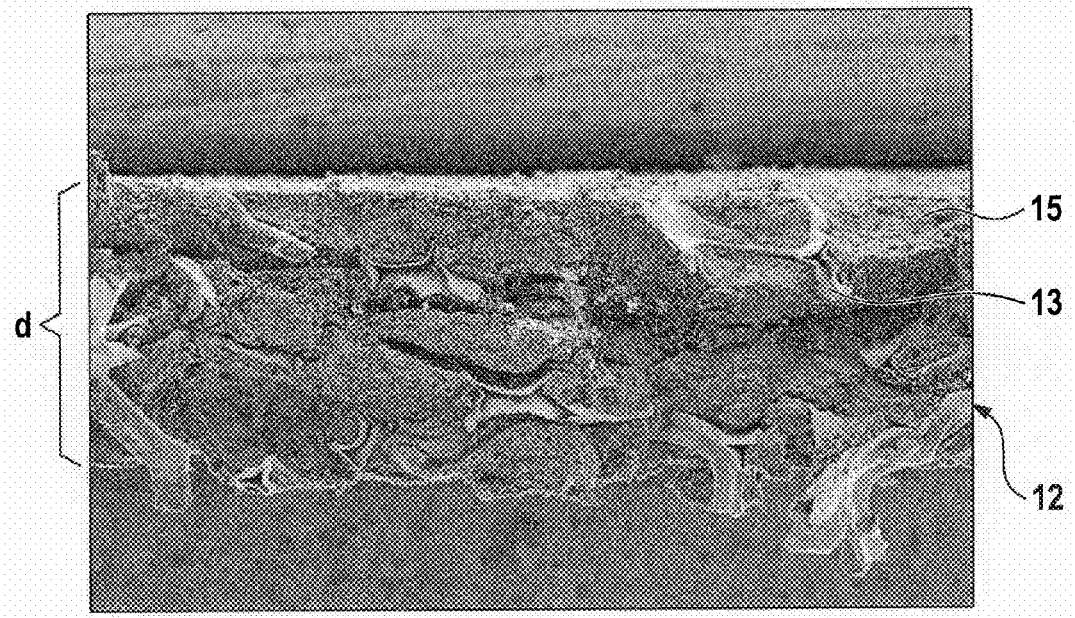
FIG. 3 shows a cross-sectional view of a positive electrode.

The resultant electrode structure is shown in FIG. 3, again in the form of an electron microscope image. The electrode material was cooled in liquid nitrogen and then broken, because a cutting operation would have corrupted the structural features. In spite of certain material damage caused by breaking, the primary features of the structure of a positive electrode according to the invention are clearly visible in FIG. 3.

The electrode is very thick in comparison with known LIP electrodes. In the example shown here, the thickness d is approximately 0.6 mm. The three-dimensional porous metal structure 13 of the current collector element extends essentially over the whole thickness d of the current collector element and the active LIP material 15 is distributed essentially homogeneously therein. With respect to the two stated conditions, "essentially" is to be construed such that the cell function is only slightly impaired by any deviations. In any case, the porous metal structure should extend over at least 70%, preferably at least approximately 80%, of the thickness of the electrode.

The positive electrode contains a binding agent to improve its mechanical strength. In the context of the invention, fluorinated binding agents, in particular THV (terpolymer of tetrafluoroethylene, hexafluoropropylene and vinylidene fluoride) and PVDF (polyvinylidene fluoride), have proven suitable. Advantageously, it is sufficient if the binding agent is contained in the electrode in a relatively low concentration.

The negative electrode contains as active material preferably carbon in a form suitable as insertion material for taking in lithium ions. The structure is preferably similar to that of the positive electrode with the following features:

For the negative electrode also, the current collector element preferably has a three-dimensional porous metal structure, in particular in the form of a metal foam.

It is relatively thick, having a thickness of at least 0.2 mm, the following values being further preferred in this order: 0.3 mm, 0.4 mm, 0.5 mm, 0.6 mm.

The quantity of active material of the negative electrode per unit area is at least 10 mg/cm$^2$, the following values being further preferred in this order: 20 mg/cm$^2$, 40 mg/cm$^2$, 60 mg/cm$^2$, 80 mg/cm$^2$, 100 mg/cm$^2$.

The capacity per unit area is preferably at least 2.5 mAh/cm², the following values being further preferred in this order: 5 mAh/cm², 10 mAh/cm², 15 mAh/cm², 20 mAh/cm², 25 mAh/cm², 30 mAh/cm².

It is preferably porous, having a porosity of no more than 50%, the following values being further preferred in this order: 45%, 40%, 35%, 30%.

The binding agent proportion is preferably no more than 5 wt. %, further preferably no more than 3 wt. % and particularly preferably no more than 1 wt. %. A negative electrode that does not contain any binding agent is particularly preferred.

Further information on the invention and its preferred embodiments is provided on the basis of the experiments described below.

Experiment 1:

A paste was produced using the following components:
94 wt. % undoped lithium iron phosphate with carbon surface coating; mean particle size approx. 2-3 µm
2 wt. % carbon black as conductivity agent
4 wt. % THV as binding agent, First the binding agent was dissolved in acetone, then carbon black was added to the solution while stirring, and finally the active mass was added alternately with further solvent, also while stirring.

The paste was incorporated homogeneously into a metal foam having an initial porosity of more than 90%, and dried for an hour at 50° C. After cooling, the electrode material was pressed by means of a calender to a thickness of 0.6 mm, starting from an initial thickness of 1.6 mm. It was then subjected to a tempering process at 180° C. The resultant electrode material had a cross-section corresponding to FIG. 3.

Pieces with a size of 1 cm² were cut out of the electrode material. The pieces had a capacity of approx. 13 mAh. They were then examined in an E-cell with a three-electrode arrangement, in which the reference and counter electrodes were made of metallic lithium. The electrolyte used in the E-cell had the composition $LiAlCl_4 * 1.5\ SO_2$.

In order to determine the discharge capacities of the electrodes for different current loads, 40 charging and discharging cycles were performed in the E-cells. Charging took place in each case with the same charging rate of 1 C ("C" indicates a factor of the nominal capacity charged or discharged in one hour). Discharging took place after each charging operation, with the cells being discharged at the following rates in the 40 cycles:
10 cycles 1 C
4 cycles each 2 C, 4 C, 8 C, 10 C, 15 C
10 cycles 1 C.

Charging took place up to a voltage of 3.7 V. Discharging ended at a voltage of 3.2 V.

Figure 4:
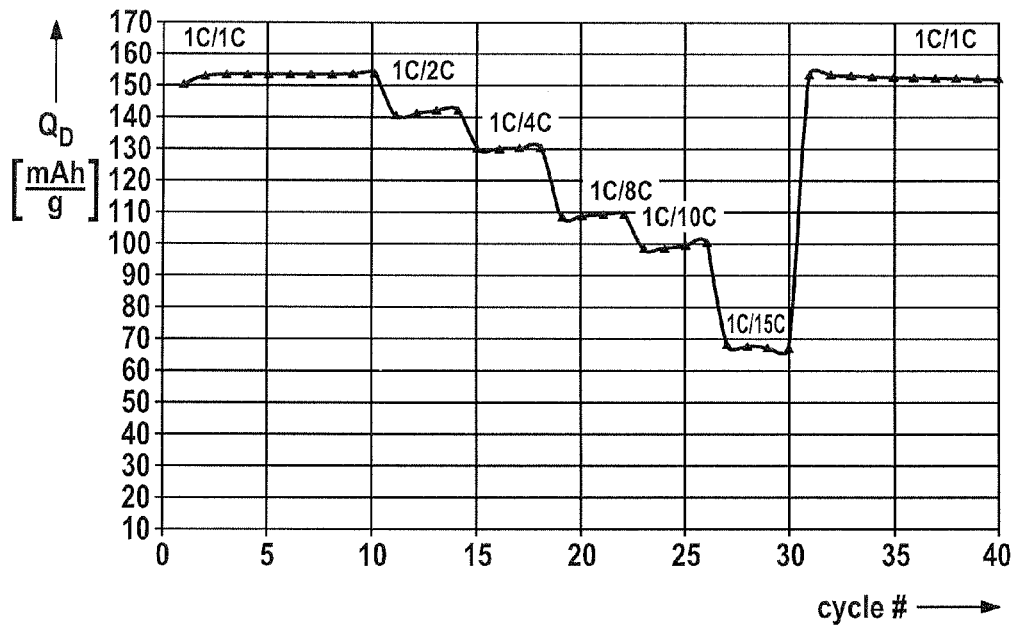
FIG. 4 shows the dependence of the discharge capacity on the number of cycles for an experiment performed with a positive electrode.

FIG. 4 shows, as mean values over eight experiments, the discharge capacity $Q_D$ in mAh/g as a function of the cycle number. It is evident from the figure that a large share of the nominal capacity is still available even with very high discharge rates. If, for example, the cell is discharged with such a high current that it is empty in six minutes (10 C), it is still possible to extract two thirds of the nominal capacity.

Figure 5:
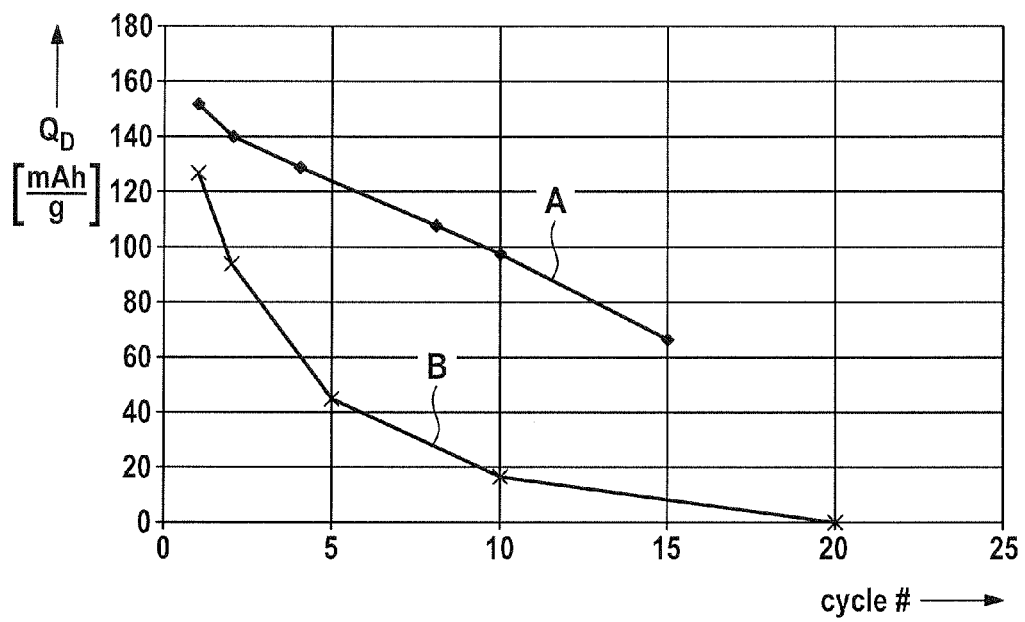
FIG. 5 shows the dependence of the discharge capacity on the discharge rate for an experiment performed with a positive electrode in comparison with published results.

FIG. 5 summarizes the results illustrated in FIG. 4, showing the discharge capacity $Q_D$ as a function of the discharge rate C (graph A). Graph B shows values from the publication

(12) W. Porcher et al., "Design of Aqueous Processed Thick LiFePO4 Composite Electrodes for High-Energy Lithium Battery, J. Electrochem. Soc., 2009, A133-A144

This publication describes the production of relatively thick electrodes for organic lithium-ion cells. Here a thickness of 0.2 mm is already considered as thick (in comparison with previously usual thicknesses). The electrodes are manufactured with a water-soluble binding agent in aqueous suspension. The resulting capacity per unit area ("capacity density") is specified as 3 mAh/cm², with loading of 20 mg/cm² and an electrode thickness of 200 µm. The measurement data plotted in FIG. 5 was taken from FIG. 1 on Page A135 of the publication for their best material ("CMC"). It is evident that the capacity decreases with the discharge rate much faster than for the electrode according to the invention. For a discharge rate of 10 C, for example, the positive electrode described in the publication for an organic lithium-ion cell has a discharge capacity of 18 mAh/g compared with 100 mAh/g for the present invention. The comparison is summarized by the following Table 1:

TABLE 1

|  | Invention | Porcher et al. |
| --- | --- | --- |
| Capacity per unit area [mAh/cm²] | 13 | 3 |
| Loading with active mass [mg/cm²] | 76 | 20 |
| Electrode thickness [µm] | 500 | 200 |
| Specific discharge capacity for 10C [mAh|g] | 100 | 18 |

Figure 6:
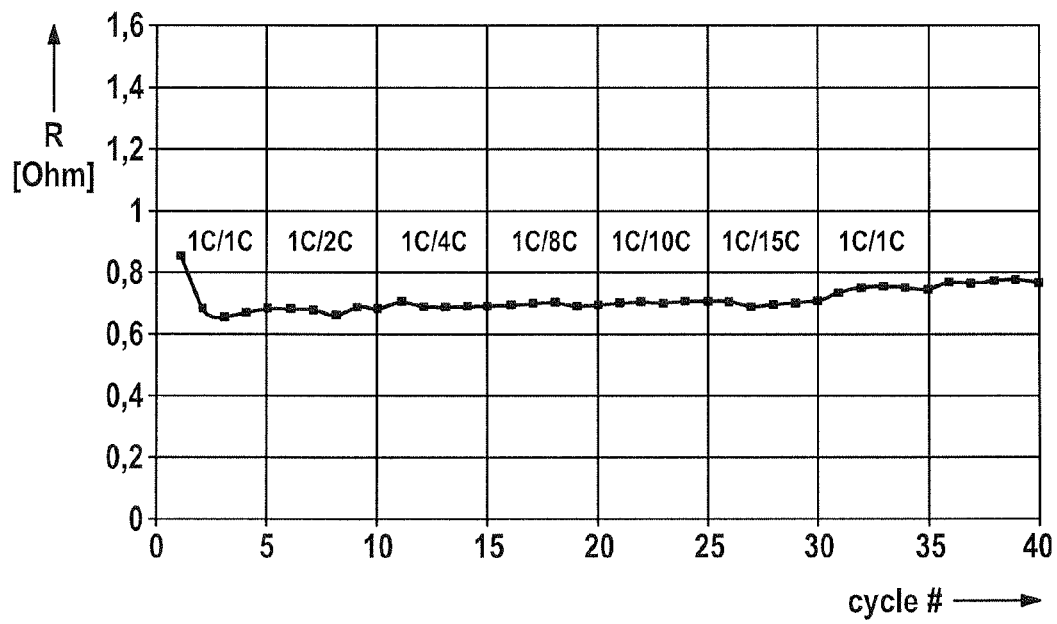
FIG. 6 shows the dependence of the electrical resistance of an electrode on the number of cycles for an experiment performed with a positive electrode.

FIG. 6 shows the values for the resistance R of the electrode that were measured on the E-cells after charging, as a function of the cycle number. In spite of the very high discharge rates, the resistance of the electrode remains largely stable in the range between 0.6 and 0.8 ohms.

Experiment 2:

For this experiment, a spirally wound cell of the type Sub-C was produced, the electrodes having a capacity of 17 mAh/cm² (positive electrode with LIP mass as for experiment 1).

The electrodes were wound into a spiral together with a separator positioned between them and placed in the Sub-C housing. This was then filled with an electrolyte solution with the composition $LiAlCl_4.6SO_2$.

The cell was charged with a charging rate of 0.7 C to 831 mAh. The discharge current was 10 A, corresponding to a discharge rate of 7 C. Discharging was stopped at a cell voltage of 2 V and with an extracted capacity of 728 mAh. This corresponds to 88% of the charged capacity. It was thus possible to prove the high current-carrying capacity.

Experiment 3:

Using a positive electrode according to the invention and a positive electrode containing lithium cobalt oxide as the active material, but otherwise having the same features, the dependence of the capacity on the number of charging and discharging cycles (each with 1 C) in an E-cell was determined.

Figure 7:
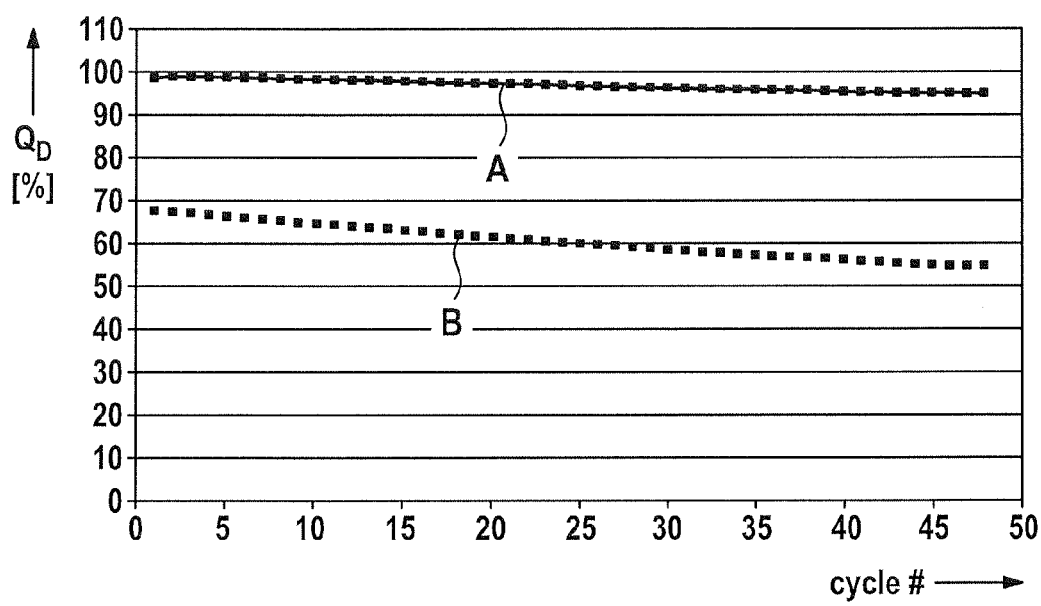
FIG. 7 shows the dependence of the capacity on the number of cycles for an experiment performed with two different positive electrodes.

FIG. 7 shows the results obtained using an $SO_2$ electrolyte containing 1.5 mol $SO_2$ per mole of conductive salt (lithium tetrachloroaluminate). The discharge capacity $Q_D$ in percent of the theoretical value is plotted against the number of charging and discharging cycles performed, where graph A relates to the LIP electrode and graph B to the lithium cobalt oxide electrode. It is evident that almost the entire theoretical capacity can be practically used with the LIP electrodes, whereas on average only around 60% of the theoretical capacity is available in practice for the comparison electrode. This essentially compensates for the higher theoretical capacity of the lithium cobalt oxide (273 mAh/g) in comparison with the LIP (170 mAh/g).

Figure 8:
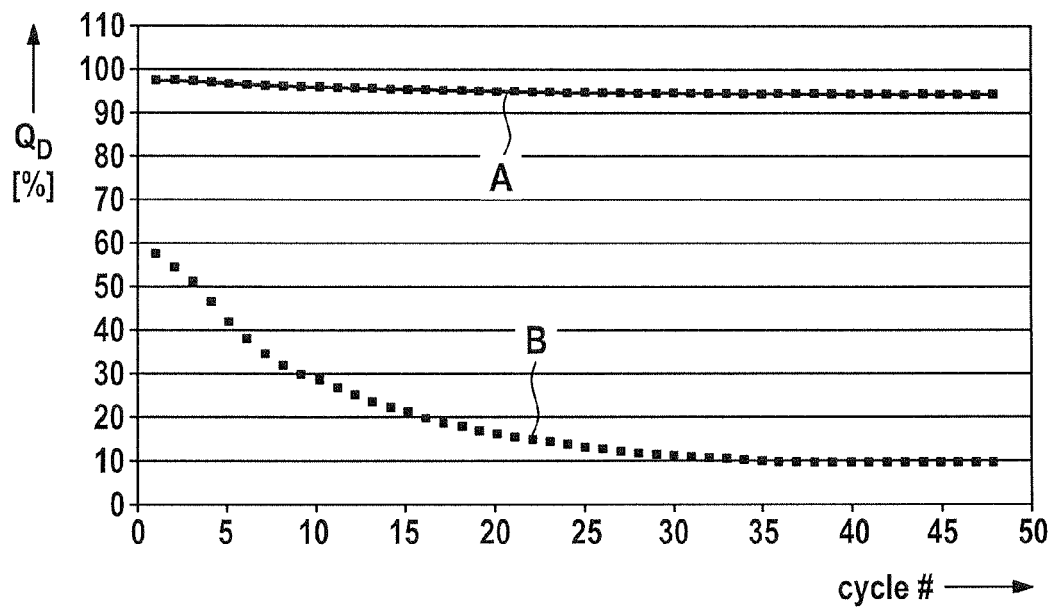
FIG. 8 shows the dependence of the capacity on the number of cycles for a further experiment performed with two different positive electrodes.

FIG. 8 shows the results of an experiment that differed from the experiment that served as a basis for FIG. 7 only with respect to the concentration of the conductive salt in the electrolyte. In this case it was 4.5 mol $SO_2$ per mole of LiAlCl$_4$. It is evident that the LIP electrode behaves very well also in the electrolyte containing a lower conductive salt concentration (graph A), whereas the capacity for the lithium cobalt oxide electrode rapidly falls to unacceptably low values (graph B).

Figure 9:
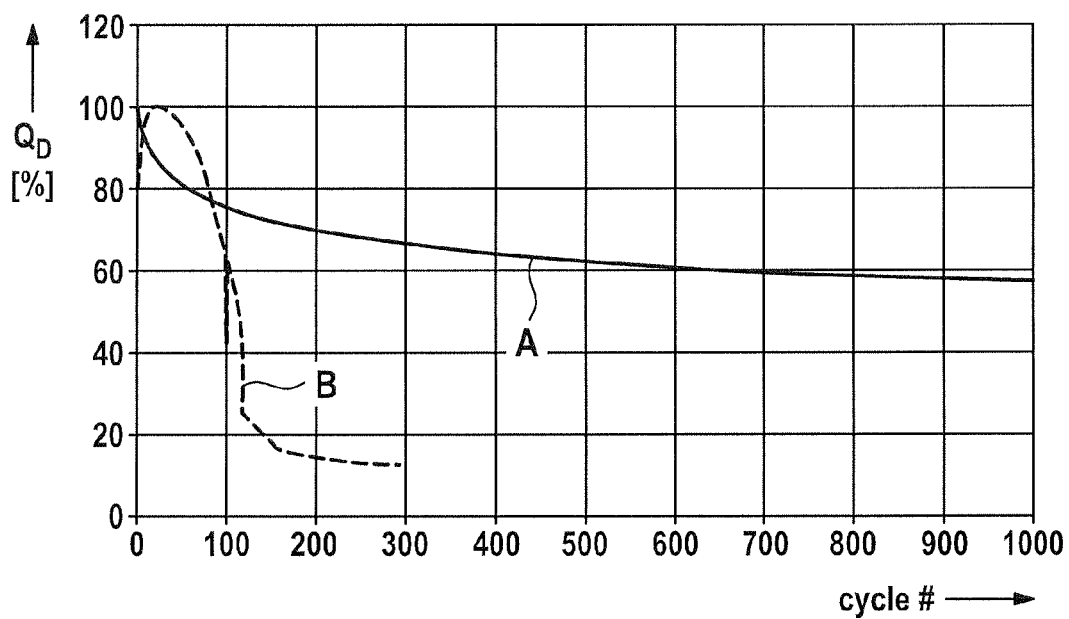
FIG. 9 shows the dependence of the discharge capacity on the number of cycles for an experiment performed with two different positive electrodes.

Experiment 4:

FIG. 9 shows the results of an experiment in which the function of a complete cell with a negative carbon electrode, an SO$_2$ electrolyte, and a positive electrode according to the invention with a capacity of 19 mAh/cm$^2$ (graph A) was compared with a cell with a positive electrode based on lithium cobalt oxide (graph B), but otherwise having the same features. In this case, the electrolyte contained 6 mol of SO$_2$ per mol LiAlCl$_4$.

The discharge capacity Q$_D$ in percent of the nominal value is plotted against the number of cycles. After an initial decrease, the extractable capacity for the cell according to the invention is almost constant, whereas it rapidly decreases to unacceptably low values for the comparison cell. This confirms the superiority of the cell according to the invention, in particular in combination with an electrolyte containing a relatively high SO$_2$ proportion.

Overall, it was found in the context of the invention that it is advantageous to use an electrolyte with a relatively low conductive salt content relative to the quantity of SO$_2$. This contradicts the recommendations predominantly given in the prior publications on lithium-SO$_2$ cells, to use an electrolyte with a relatively low SO$_2$ proportion, in particular with regard to the vapor pressure.

A means to improve the capacity stability of the cell which can be used alternatively or additionally to the high SO$_2$ content, is the addition of a lithium halogenide, preferably a lithium chloride, this salt being contained preferably as an admixture in the active mass of the positive electrode.

Figure 10:
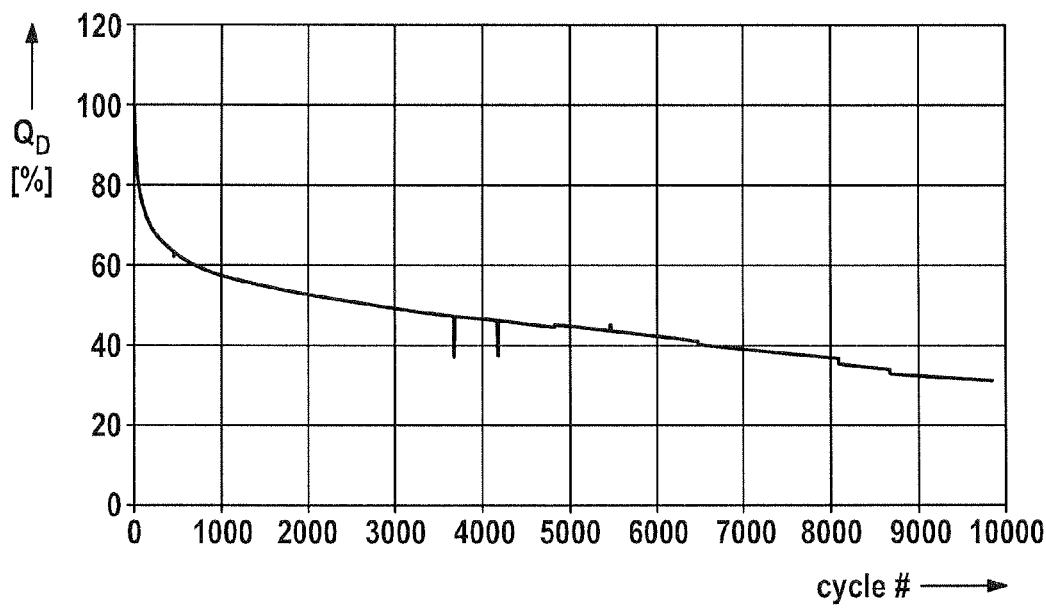
FIG. 10 shows the dependence of the capacity on the number of cycles for a long-duration experiment.

FIG. 10 shows the results of a long-duration test with a cell as for FIG. 9, graph A, where the extracted capacity Q$_D$ is again plotted against the number of cycles. The figure shows approx. 9,700 cycles, in which the reduction in the extractable capacity per 100 cycles is exceptionally low, namely less than 0.4%.

Cover-Layer-Reducing Pretreatment:

As described above, it is possible to improve the capacity stability of lithium-SO$_2$-cells with at least one insertion electrode, particularly an intercalation electrode, by means of a pretreatment to reduce covering layers on at least one insertion electrode. There are various possibilities to this end.

A first possibility is to subject the insertion electrode to a temperature treatment. This applies in particular for carbon electrodes, which are tempered at a temperature of at least 900° C. under exclusion of oxygen (preferably under inert gas) for a long time (at least 10, preferably at least 20 and particularly preferably 40 hours).

Alternatively or additionally, the formation of covering layers on a negative carbon electrode can be reduced by using a graphite material with a relatively low specific surface area.

According to a further preferred embodiment, the pretreatment to reduce the covering layers comprises providing the corresponding electrode with a thin surface coating.

Such a surface coating can be effected in particular by means of atomic layer deposition. This method has been used in recent times for numerous purposes. An overview is given, for example, in the publication

(13) S. M. George "Atomic Layer Deposition: An Overview", Chem. Rev. 2010, 111-131

The process parameters should be adapted to the requirements of the electrode. In the context of the invention, it was found that particular advantages are obtained if the carbon electrode is pretreated with NO$_2$-TMA (nitrogen dioxide-trimethylaluminum). This seeds an initial functional layer on the carbon, this layer being advantageous for subsequent ALD treatment. In this context, reference can additionally be made to

(14) G. M. Sundaram et al. "Leading Edge Atomic Layer Deposition Applications", ECS Transactions, 2008, 19-27

Preferably coating by ALD refers to a thin layer of Al$_2$O$_3$. According to current knowledge, SiO$_2$ is a suitable alternative.

A further possibility for applying a surface coating suitable for reducing the covering layers is dip coating. To this end, either the insertion active material intended for processing into the electrode or the whole electrode is brought into contact with a reaction solution that contains starting materials suitable for the formation of the layer. A temperature treatment is then performed to form and harden the layer. The following method can be used, for example:

Isopropanol, water, 1 molar hydrochloric acid and tetra-ethylorthosilicate are mixed in a mole ratio of 3:1:1:1. The solution is kept at room temperature. It is then diluted with isopropanol in the volume ratio 1:1. The electrodes to be treated are dipped in the reaction solution for 30 seconds or, if bubble formation is observed, until bubble formation has stopped. The electrodes are then dried in a drying cabinet at 200° C. without vacuum for 48 hours.

Figure 11:
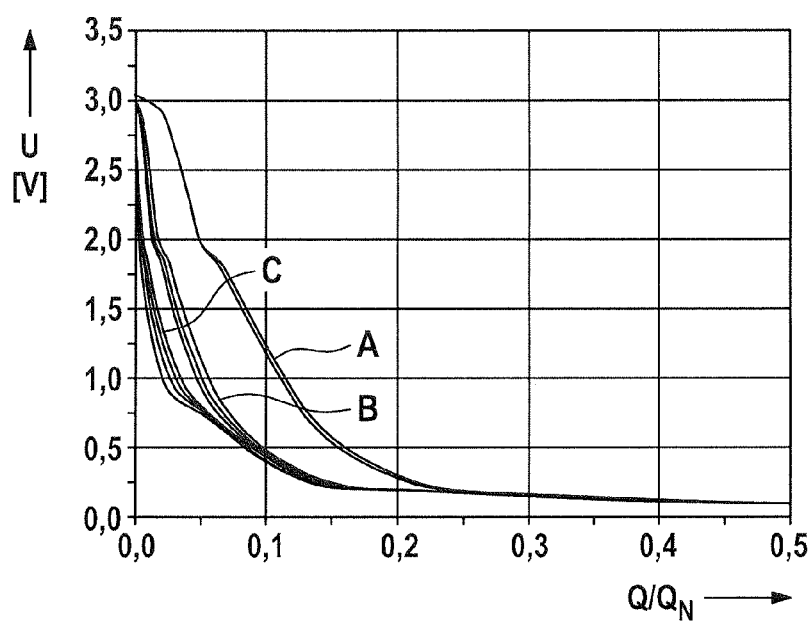
FIG. 11 shows the dependence of the electrical voltage on the charging capacity for three differently pretreated negative electrodes.

FIG. 11 shows the results of an experiment with the following electrode materials:

A negative electrode without cover-layer-reducing pretreatment

B negative electrode where the active material was pretreated by means of dip coating with formation of an SiO$_2$ layer, before incorporation in the electrode C negative electrode that was pretreated as a whole by means of dip coating with formation of an SiO$_2$ layer.

This application claims priority to EP 10001458.8 filed Feb. 12, 2010, which is hereby incorporated by reference.

The three experimental electrodes were examined in an E-cell. During charging of the electrode, the voltage U against lithium was plotted in volts against the charge state Q, as fraction of the nominal capacity Q$_N$. The three graph groups illustrated show the results of several experiments in each case with the above-described electrodes. In FIG. 11, the area below the graph corresponds to the cell capacity lost due to covering layer formation. It is evident that the capacity loss for the two pretreated electrodes is significantly less than for the untreated electrode, the electrode pretreated in its entirety being the slightly better than the other pretreated electrode.

The invention claimed is:

1. A rechargeable lithium battery cell comprising a housing, a positive electrode, a negative electrode and an electrolyte comprising a conductive salt,
   wherein
   the electrolyte is based on SO$_2$ and is essentially free of organic materials; and
   the positive electrode comprises an active material comprising the composition LiFePO$_4$ and wherein the positive electrode comprises a three dimensional porous metal current collector and the electrolyte comprises at least 2 mole SO$_2$ per mole of conductive salt.

2. The battery cell according to claim 1, wherein the positive electrode has a thickness of at least 0.3 mm.

3. The battery cell according to claim 2, wherein the positive electrode has a thickness of from 0.3 mm to 0.6 mm.

4. The battery cell according to claim 1, wherein the positive electrode comprises a quantity of active material per unit area of from 30 mg/cm$^2$ to 140 mg/cm$^2$.

5. The battery cell according to claim 1, wherein the positive electrode comprising the active material and the current collector is porous, the porosity being from greater than 0% to no more than 50%.

6. The battery cell according to claim 1, wherein the three-dimensional porous metal current collector is a metal foam.

7. The battery cell according to claim 1, wherein the porous metal current collector extends essentially over the entire thickness of the positive electrode.

8. The battery cell according to claim 1, wherein the active material is distributed essentially homogeneously in the positive metal current collector.

9. The battery cell according to claim 1, wherein the negative electrode comprises active material and a current collector, the negative electrode having a thickness of from 0.2 mm to 0.6 mm.

10. The battery cell according to claim 1, wherein the positive electrode comprises a binding agent, wherein the concentration of the binding agent is from greater than 0% to no more than 10%.

11. The battery cell according to claim 10, wherein the binding agent is a fluorinated binding agent.

12. The battery cell according to claim 11, wherein the binding agent is a terpolymer of tetrafluoroethylene.

13. The battery cell according to claim 1, wherein the negative electrode comprises carbon as an active material for inserting lithium ions.

14. The battery cell according to claim 1, wherein the negative electrode comprises a quantity of active material from 10 mg/cm$^2$ to 140 mg/cm$^2$.

15. The battery cell according to claim 1, wherein the negative electrode comprises active material and a current collector and is porous, the porosity being from greater than 0% to no more than 50%.

16. The battery cell according to claim 1, wherein the negative electrode, comprising active material, comprises a binding agent, wherein the concentration of the binding agent is from greater than 0 wt. % to no more than 5 wt. %.

17. The battery cell according to claim 1, wherein the conductive salt is a lithium tetrahalogenoaluminate.

18. The battery cell according to claim 1, wherein the cell has a current carrying capacity, per unit area of the positive electrode, of from 10 mA/cm$^2$ to 300 mA/cm$^2$.

19. The battery cell according to claim 18, wherein the cell has a current carrying capacity, per unit area of the positive electrode, of from 10 mA/cm$^2$ to 150 mA/cm$^2$.

20. The battery cell according to claim 1, wherein the cell comprises a lithium halogenide.

21. A method for producing an electrode for a battery cell according to claim 1, comprising:
    producing a paste mass from the active material with optional admixture of a binding agent and/or a conductivity-improving material;
    homogeneously incorporating the paste mass into a three-dimensional porous metal structure;
    pressing the three-dimensional metal structure containing the paste mass in such a manner that its thickness is reduced.

22. The battery cell according to claim 1, wherein the electrolyte comprises from 2 mole $SO_2$ to 6 mole $SO_2$ per mole of conductive salt.

23. The battery cell according to claim 22, wherein the conductive salt is lithium tetrachloroaluminate.

24. The battery cell according to claim 1, wherein the active material composition of $LiFePO_4$ further comprises vanadium.

25. The battery cell according to claim 1, wherein the active material composition of $LiFePO_4$ is doped.

26. The battery cell according to claim 1, wherein the active material composition of $LiFePO_4$ is without doping.

27. The battery cell according to claim 1, wherein the negative electrode, comprising active material and a current collector, has a thickness of at least 0.2 mm.

28. A rechargeable lithium battery cell comprising a housing, a positive electrode, a negative electrode and an electrolyte comprising a conductive salt,
    wherein
    the electrolyte is based on $SO_2$;
    the positive electrode comprises an active material comprising the composition $LiFePO_4$ and wherein the positive electrode comprises a three dimensional porous metal current collector and the electrolyte comprises at least 2 mole $SO_2$ per mole of conductive salt; and
    the negative electrode comprises a quantity of active material of between 10 mg/cm$^2$ to 140 mg/cm$^2$.

* * * * *